United States Patent [19]

Kishimura et al.

[11] Patent Number: 4,510,279

[45] Date of Patent: Apr. 9, 1985

[54] METHACRYLATE RESIN COMPOSITION FOR OPTICAL INFORMATION RECORDING MEDIUM

[75] Inventors: Masaaki Kishimura, Iwakuni; Nobuyuki Arakawa, Yokohama, both of Japan

[73] Assignees: Mitsubishi Rayon Co., Ltd.; Sony Corporation, both of Tokyo, Japan

[21] Appl. No.: 405,740

[22] Filed: Aug. 6, 1982

[30] Foreign Application Priority Data

Aug. 12, 1981 [JP] Japan ................................ 56-126364

[51] Int. Cl.[3] .................... C08L 33/10; C08L 33/12
[52] U.S. Cl. .................................. 524/144; 369/284; 369/287; 369/288; 524/168; 524/319; 524/560; 525/200; 526/174; 526/203; 526/246
[58] Field of Search .............. 524/144, 168, 319, 560; 525/200; 526/329.7, 203, 246; 523/174

[56] References Cited

U.S. PATENT DOCUMENTS

| | | | |
|---|---|---|---|
| 2,321,759 | 6/1943 | Macht et al. | 526/329.7 |
| 2,937,098 | 5/1960 | Geen | 524/319 |
| 3,087,905 | 4/1963 | Fluck | 524/168 |
| 3,405,167 | 10/1968 | Braun | 524/560 |
| 3,491,169 | 1/1970 | Raynolds et al. | 525/200 |
| 3,657,181 | 4/1972 | Riedesel | 524/168 |
| 3,839,254 | 10/1974 | Fang | 524/144 |
| 3,925,297 | 12/1975 | Sprengling | 524/319 |
| 4,125,654 | 11/1978 | Kaneko et al. | 523/174 |
| 4,241,120 | 12/1980 | Datta et al. | 523/174 |
| 4,399,251 | 8/1983 | Lee | 524/560 |
| 4,409,351 | 10/1983 | Lee | 524/560 |
| 4,412,941 | 11/1983 | Probst et al. | 523/174 |

Primary Examiner—Harry Wong, Jr.
Attorney, Agent, or Firm—Oblon, Fisher, Spivak, McClelland & Maier

[57] ABSTRACT

A methacrylate resin composition for optical information recording medium, excellent in releasability from mold, consisting of (A) 100 parts by weight of a methacrylate resin and (B) 0.1 to 3.0 parts by weight of a surface active agent having a fluoroalkyl group.

6 Claims, No Drawings

METHACRYLATE RESIN COMPOSITION FOR OPTICAL INFORMATION RECORDING MEDIUM

This invention relates to a methacrylate resin composition for use in optical information recording material.

Methacrylate resin has been widely used in lighting fixtures, signboards, various decorations, and name plates by virtue of its excellent transparency, desirable mechanical properties, good processability, and the good appearance of molded articles. In recent years the resin has begun to find use in information recording materials such as video discs, audio discs, and information filing discs or memory discs for computers. For the base material for information recording, medium there has heretofore been proposed the utilization of polyvinyl chloride, polystyrene, and methacrylate resins in sheet or film form from the viewpoint of convenience of handling owing to their light weight. Of these materials, methacrylate resin is most suitable particularly for use in the information recording system in which the reproduction is effected by means of a laser beam, because the resin has advantages of excellent light transmittance, superior scratch resistance to that of polyvinyl chloride, low double refraction, and good appearance due to satisfactory surface precision.

In an example of the information recording material used in the optical information reproduction system, the information is stored in a sequence of pits provided on the plane of the recording medium and the whole surface of the medium is covered with reflected metal layer.

Accordingly, in reproduction of the information, the signals are read out by eradiation of the sequence of pits by the laser beam. Output signal is derived by detecting the difference in reflection of the laser beam between the surface of medium and the pits. An example of the procedure for producing such an information recording medium is given below.

At first, a uniform photoresist film is formed, for example, on a base plate glass and exposed to a laser beam modulated in accordance with the information signals being recorded. The photoresist film which received the exposures corresponding to the information signals is then developed to record the information signals in the form of a sequence of vertical pits in the photoresist layer. Using the original master recording thus produced, a stamper carrying a mechanically negative pattern is prepared by employing the technique of electroforming repeated a necessary number of times as in the case of manufacturing phonographic recording discs. Using the stamper, a molded replica of the original master is prepared by compression or injection molding. After providing a metallic reflection coating on the replica pattern, a protective coating is further applied thereon to obtain an information recording medium.

Since the information recording medium is prepared by injection or compression molding, as described above, the releasability from the mold is one of the material characteristics as important as other characteristics required for the information recording medium, such as dimensional stability, mold flow, resistance to deformation, mechanical strength, scratch resistance, and surface precision.

The release agents conventionally used for the methacrylate resin are generally aliphatic alcohols, aliphatic esters, phthalate esters, and triglycerides. However, when a normal amount of these release agents is used by incorporating it in the molding material for information recording medium, the releasability of the molded article is insufficient in the cases of injection molding and compression molding performed by use of the stamper. Particularly in compression molding a high releasability is required, because in the case of high-density recording of signals such as, for example, signals in so-called video disc, the signals are microstructurally recorded so that an insufficiency of releasability will cause damage of the recorded surface, resulting in unsatisfactory reproduction of the signals. On the other hand, if the release agent is incorporated in an amount sufficient for imparting satisfactory releaseability, there will occur reduced transparency, decreased thermal resistance, or discoloration of the recording disc, or staining of the disc surface due to bleeding of the release agent, thus rendering the recording material useless for the optical information recording system.

The present inventors conducted an extensive study from the viewpoint that the releasability of the molded product from the mold is an important factor for the production of a high-quality information recording medium from a methacrylate resin used as an optical information recording material. As a result, it was found that by incorporating as the release agent a specific amount of a surface active agent having a fluoroalkyl group into the resin it is possible to impart to the molded information recording material a desirable releasability without deteriorating the inherent characteristics of the methacrylate resin.

According to this invention there is provided a methacrylate resin composition for optical information recording medium, comprising (A) 100 parts by weight of a methacrylate resin and (B) 0.1 to 3.0 parts by weight of a surface active agent having a fluoroalkyl group. The composition of this invention shows excellent releasability when used in either injection molding or compression molding, the advantages of the composition being more evident in the latter case.

The methacrylate resin used in this invention can be any of those which are generally used, such as a homopolymer of methyl methacrylate or a copolymer formed from a monomer mixture containing 70% by weight or more of methyl methacrylate and the balance of an alkyl acrylate or an alkyl methacrylate and/or a monomer copolymerizable therewith, provided said homopolymer or copolymer has transparency, mechanical properties, and other characteristics required for the information recording material.

As examples of the surface active agent having a fluoroalkyl group used in this invention, mention may be made of those having a perfluoroalkyl group of 3 to 12 carbon atoms, such as (1) copolymers of perfluoroalkyl acrylate and polyalkylene oxide acrylate, (2) reaction product of a substituted alkanol having a perfluoroalkyl group in its structure with polyalkylene oxide, (3) phosphate esters containing perfluoroalkyl group and the like. The above compound (1) may be produced by copolymerizing perfluoroalkyl acrylate and polyalkylene oxide acrylate in the presence of polymerization initiator. The surface active agent having a molecular weight of 2,000 to 30,000 may be preferably used. The above compound (3) may be produced by reacting an alkanol containing perfluoroalkyl group with phosphorus oxychloride or phosphoric dichloride and then hydrolyzing.

Such surface active agents are already commercialized and easily available. The surface active agent having a fluoroalkyl group is incorporated in an amount of 0.1 to 3.0, preferably 0.2 to 1.5, parts by weight for 100 parts by weight of the methacrylate resin. If the incorporated amount is below 0.1 parts by weight, a desirable releasability of the resin composition is not obtained and, as a consequence, the surface of molded information recording material will be damaged, resulting in not only imperfect signal reproduction but also reduced productivity; also there is even the damaging the stamper. On the other hand, if the surface active agent is incorporated in an amount exceeding 3.0 parts by weight, the composition will show a turbidity or yellowish discoloration, rendering the composition unsuitable for use in the optical information recording medium; also an excess surface active agent causes a decrease in productive efficiency of the composition.

The present methacrylate resin composition for use in optical information recording medium is obtained, for example, by blending in a mixer a methacrylate resin in bead or pellet form and a fluoroalkylated surface active agent and milling the molten blend in a heated extruder to obtain a methacrylate resin composition in pellet form.

The composition thus obtained is characterized by being moldable by injection or compression without degradation of the quality and is easily removable from the mold to produce an information recording material which permits precise signal reproduction.

The invention is further illustrated below in detail with reference to Examples, in which all parts are by weight.

EXAMPLE 1

A mixture of 100 parts of a methacrylate resin in bead form ("Acrypet ®MFNLK" of Mitsubishi Rayon Co.) and 1.5 parts of a fluoroalkylated surface active agent "Megafac ®F177" (a copolymer of perfluoroalkyl acrylate and polyalkylene oxide acrylate, produced by Dainippon Ink and Chemicals Co.) was stirred in a mixer ("Super Mixer, Type SMV-20" of Kawata Seisakusho Co.) at a stirrer speed of 1,000 rpm for 3 minutes. The resulting mixture was uniformly milled with heating in a 40-mm screw extruder to obtain a pelletized methacrylate resin composition. The resulting composition was evaluated for releasability by means of "Labo Plast Mill" (Toyo Seiki Co.) and by compression molding. The releasability was found to be good.

The releasability was evaluated in the following manner.

(1) By means of "Labo Plast Mill":

In "Labo Plast Mill" of Toyo Seiki Co., was charged about 50 g of pelletized or beaded methacrylate resin as the sample. The sample was preheated for 5 minutes, and after the temperature of resin reaches 198° C., was melted and milled for 9 minutes. Then the degree of adherence of the molten resin to the screw and the cylinder was inspected.

(2) By compression molding:

A mold 130 mm × 130 mm in inside dimension equipped on its upper and lower faces with stainless steel plates having mirror-finished surface was heated to 190° C. Into the mold, methacrylate resin was charged, preheated under a pressure of 29 Kg/cm$^2$ for 15 minutes and then molded while cooling with water the mold in 5 seconds under a pressure of 290 Kg/cm$^2$ to obtain a square sheet 1.5 mm in thickness. At the time when the sheet was cooled to 80°–90° C., the adhesion between the molded sheet and the stainless steel plates was inspected.

The above resin composition was compression molded into a disc by using a stamper prepared in a customary manner from an original master disc carrying recorded video signals. The molded disc was provided with an aluminum reflection coating and a protective coating to obtain a video disc.

The video signals carried by this video disc were reproduced by means of a video disc player (Sony Corp.). Steady images were reproduced throughout from the beginning till the end. This confirmed uniform release of the molded resin composition from the stamper.

EXAMPLES 2 TO 15 AND COMPARATIVE EXAMPLES 1 TO 8.

Various surface active agents having fluoroalkyl groups, shown in Table 1, were each added to 100 parts of a methacrylate resin in bead or pellet form ("Acrypet ®" of Mitsubishi Rayon Co.). In a manner similar to that in Example 1, a pelletized methacrylate resin composition was prepared from each mixture and evaluated for releasability. The obtained results were as shown in Table 1.

TABLE 1

| | Type of methacrylate resin | Release agent, % | | Releasability | | Remarks |
|---|---|---|---|---|---|---|
| | | | | Labo Plast Mill | Comp molding | |
| Example No. | | | | | | |
| 1 | Bead | No. 1 | 1.5 | | | |
| 2 | " | " | 0.5 | | | |
| 3 | " | " | 0.75 | − | | |
| 4 | " | " | 1.0 | | | |
| 5 | " | " | 2.0 | | | |
| 6 | " | " | 3.0 | | | |
| 7 | Pellet | " | 0.75 | − | | |
| 8 | " | " | 1.25 | | | |
| 9 | Bead | No. 4 | 1.5 | | | |
| 10 | " | No. 5 | 1.0 | | | |
| 11 | " | No. 2 | 1.0 | − | | |
| 12 | " | " | 1.5 | | | |
| 13 | Pellet | " | 1.0 | − | | |
| 14 | Bead | No. 3 | 1.0 | | | |
| 15 | " | " | 1.5 | | | |
| Comp. Ex. No. | | | | | | |
| 1 | Bead | — | — | x | x | |
| 2 | " | No. 1 | 0.05 | x | x | |

TABLE 1-continued

| | Type of methacrylate resin | Release agent, % | | Releasability Labo Plast Mill | Comp molding | Remarks |
|---|---|---|---|---|---|---|
| 3 | " | " | 3.5 | | | Yellowish; turbid |
| 4 | Pellet | — | — | x | x | |
| 5 | " | No. 1 | 0.05 | x | x | |
| 6 | Bead | No. 2 | 0.05 | x | x | |
| 7 | " | " | 3.5 | | | Yellowish; turbid |
| 8 | Pellet | " | 0.05 | x | x | |

Note:
*Methacrylate resin, bead form: "Acrypet MFNLK" (Mitsubishi Rayon Co.)
Methacrylate resin, pellet form: "Acrypet MFNL" (Mitsubishi Rayon Co.)
*Release agent:
No. 1 Perfluoroalkyl acrylate - polyalkylene oxide acrylate copolymer ("Megafac ® F177" of the formula shown below; Dainippon Ink and Chemicals Co.)

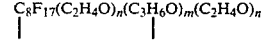
$C_8F_{17}(C_2H_4O)_n(C_3H_6O)_m(C_2H_4O)_n$

Reaction product of a substituted alkanol having a perfluoroalkyl group in its structure with polyalkylene oxide (EO = 10) ("Megafac ® 142D" of the formula shown below: Dainippon Ink and Chemicals Co.)

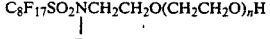
$C_8F_{17}SO_2NCH_2CH_2O(CH_2CH_2O)_nH$
|
R

No. 3 Perfluoroalkyl group containing phosphate ester ("Megafac ® F191" of the formula shown below; Dainippon Ink and Chemicals Co.)

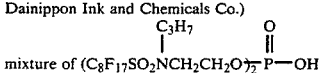
mixture of $(C_8F_{17}SO_2NCH_2CH_2O)_2$-P—OH with $C_3H_7$ substituent and =O and $(C_8F_{17}SO_2NCH_2CH_2O)$-P—(OH)$_2$ with =O No. 4 Copolymer of perfluorobutyl acrylate and polyethylene glycol monoacrylate:
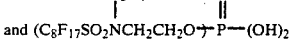
$C_4F_9$     $(C_2H_4O)_n$    (n ≈ 10)

No. 5 Copolymer of perfluorododecyl acrylate and polyethylene glycol monoacrylate:
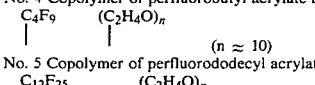
$C_{12}F_{25}$    $(C_2H_4O)_n$    (n ≈ 10)

*Releasability:
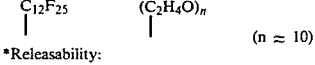
x    Δ

Poor ←——→ Good

In Example 1 a video disc was described as one of the examples of applications of the present resin composition, but the invention is, of course, not limited to such a case.

What is claimed is:

1. A transparent methacrylate resin composition consisting of a melt blended mixture of (A) 100 parts by weight of a transparent methyl methacrylate homopolymer or copolymer containing not less than 70% by weight of copolymerized methyl methacrylate and (B) 0.1 to 3.0 parts by weight of an organic compound which is a surface active agent having a perfluoroalkyl group of 3 to 12 carbon atoms, said composition being suitable for optical information recording medium, said perfluoroalkyl group containing organic surface active agent having the property of being melt blendable with component (A) in the above specified parts by weight to improve mold releasability of component (A) while retaining the transparency of the composition.

2. A methacrylate resin composition according to claim 1, wherein the surface active agent is a polymerized perfluoroalkyl acrylate.

3. A transparent methacrylate resin composition consisting of (A) 100 parts by weight of a transparent methyl methacrylate homopolymer or copolymer containing not less than 70% by weight of copolymerized methyl methacrylate and (B) 0.1 to 3.0 parts by weight of a surface active agent which is a copolymer of a perfluoroalkyl acrylate and a polyalkylene oxide acrylate, having a perfluoroalkyl group of 3 to 12 carbon atoms, said composition being suitable for optical information recording medium.

4. A transparent methacrylate resin composition consisting of (A) 100 parts by weight of a transparent methyl methacrylate homopolymer or copolymer containing not less than 70% by weight of copolymerized methyl methacrylate and (B) 0.1 to 3.0 parts by weight of a surface active agent which is a reaction product of a substituted alkanol containing perfluoroalkyl group and polyalkylene oxide, having a perfluoroalkyl group of 3 to 12 carbon atoms, said composition being suitable for optical information recording medium.

5. A transparent methacrylate resin composition consisting of (A) 100 parts by weight of a transparent methyl methacrylate homopolymer or copolymer containing not less than 70% by weight of copolymerized methyl methacrylate and (B) 0.1 to 3.0 parts by weight of a surface active agent which is a phosphate ester having a perfluoroalkyl group of 3 to 12 carbon atoms, said composition being suitable for optical information recording medium.

6. A transparent optical information recording medium composition in pellet form which consists of a melt blended mixture of (A) 100 parts by weight of a transparent methyl methacrylate homopolymer or copolymer containing not less than 70% by weight of copolymerized methyl methacrylate and (B) 0.1 to 3.0 parts by weight of an organic compound which is a surface active agent having a perfluoroalkyl group of 3 to 12 carbon atoms, said composition being suitable for optical information recording medium, said perfluoroalkyl group containing organic surface active agent having the property of being melt blendable with component (A) in the above specified proportions by weight to improve mold releasability of component (A) while retaining the transparency of the composition.

* * * * *